United States Patent
Kondrad et al.

(10) Patent No.: US 9,789,790 B2
(45) Date of Patent: Oct. 17, 2017

(54) TUNED FLEXIBLE SUPPORT MEMBER AND FLEXIBLE SUSPENSION FEATURES FOR COMFORT CARRIERS

(71) Applicant: Ford Global Technologies, LLC, Dearborn, MI (US)

(72) Inventors: Marcos Silva Kondrad, Macomb, MI (US); S. M. Akbar Berry, Windsor (CA); Richard Joseph Soyka, Jr., Shelby Township, MI (US); Johnathan Andrew Line, Northville, MI (US); Nicholas Alphonse Billardello, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

(21) Appl. No.: 14/505,683

(22) Filed: Oct. 3, 2014

(65) Prior Publication Data
US 2016/0096450 A1    Apr. 7, 2016

(51) Int. Cl.
*A47C 7/02*   (2006.01)
*B60N 2/22*   (2006.01)
(Continued)

(52) U.S. Cl.
CPC .......... *B60N 2/2222* (2013.01); *B60N 2/20* (2013.01); *B60N 2/682* (2013.01); *B60N 2/7094* (2013.01); *B60N 2/72* (2013.01)

(58) Field of Classification Search
CPC .... A47C 3/12; A47C 7/26; A47C 5/12; A47C 5/06; A47C 7/282; A47C 7/30; A47C 7/20; A47C 7/44; B60N 2/686
(Continued)

(56) References Cited

U.S. PATENT DOCUMENTS 2,958,369 A    11/1960   Pitts et al.
3,174,741 A *  3/1965    Wolff ............... A47C 7/028
                                                              267/110
(Continued)

FOREIGN PATENT DOCUMENTS

EP    0518830 A1    12/1992
EP    0754590       1/1997
(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.
(Continued)

*Primary Examiner* — David R Dunn
*Assistant Examiner* — Alexander Harrison
(74) *Attorney, Agent, or Firm* — Vichit Chea; Price Heneveld LLP

(57) ABSTRACT

A vehicle seat support carrier includes an upper seatback panel having a flexible body portion. A first set of flexible suspension members undulate in a first direction. A second set of flexible suspension members undulate in a second direction generally perpendicular to the first direction. A lower seatback panel is operably coupled to the upper seatback panel. The lower seatback panel includes a border member defining a central aperture and first and second bolster supports. A central portion of each of the first and second bolster supports includes a plurality of flexible suspension members.

20 Claims, 6 Drawing Sheets

(51) Int. Cl.
*B60N 2/20* (2006.01)
*B60N 2/68* (2006.01)
*B60N 2/70* (2006.01)
*B60N 2/72* (2006.01)

(58) Field of Classification Search
USPC ............ 297/452.15, 452.14, 451.11, 452.63, 297/452.56, 452.52, 452.53, 452.54, 291
See application file for complete search history.

(56) References Cited

U.S. PATENT DOCUMENTS

| | | | |
|---|---|---|---|
| 3,203,734 A * | 8/1965 | Seymer | A47C 7/024 297/452.2 |
| 3,328,020 A * | 6/1967 | Flint | A47C 7/30 267/102 |
| 3,332,719 A * | 7/1967 | Flint | B60N 2/7047 267/103 |
| 3,403,938 A | 10/1968 | Cramer et al. | |
| 3,565,487 A * | 2/1971 | Reiter | A47C 5/06 297/452.63 |
| 3,590,901 A * | 7/1971 | Dubinsky | A47C 5/06 160/327 |
| 3,667,532 A * | 6/1972 | Kurz | A47C 1/143 160/371 |
| 3,695,706 A * | 10/1972 | Basher | A47C 7/22 297/452.34 |
| 3,758,159 A * | 9/1973 | Morris | B60N 2/38 297/218.1 |
| 3,929,374 A | 12/1975 | Hogan et al. | |
| 4,088,367 A * | 5/1978 | Atkinson | B60N 2/242 297/183.8 |
| 4,123,105 A * | 10/1978 | Frey | A47C 5/12 297/451.1 |
| 4,136,410 A * | 1/1979 | Vandenbark | A47C 7/285 297/452.52 |
| 4,157,203 A * | 6/1979 | Ambasz | A47C 7/441 297/285 |
| 4,192,547 A * | 3/1980 | Geier | A47C 7/02 297/271.5 |
| 4,309,058 A * | 1/1982 | Barley | B60N 2/66 297/284.4 |
| 4,324,431 A | 4/1982 | Murphy et al. | |
| 4,334,709 A | 6/1982 | Akiyama et al. | |
| 4,337,931 A * | 7/1982 | Mundell | A47C 7/287 267/102 |
| 4,353,595 A | 10/1982 | Kaneko et al. | |
| 4,415,147 A * | 11/1983 | Biscoe | A47C 7/30 267/111 |
| 4,456,301 A * | 6/1984 | Apissomian | A47C 7/22 297/440.11 |
| 4,492,408 A * | 1/1985 | Lohr | B60N 2/00 248/424 |
| 4,519,651 A * | 5/1985 | Whitwam | A47C 7/02 297/411.44 |
| 4,533,174 A * | 8/1985 | Fleishman | A47B 3/06 297/16.1 |
| 4,541,669 A | 9/1985 | Goldner | |
| 4,629,248 A | 12/1986 | Mawbey | |
| 4,660,887 A * | 4/1987 | Fleming | A47C 7/022 297/448.2 |
| 4,685,738 A * | 8/1987 | Tinus | A47C 7/02 160/DIG. 15 |
| 4,697,848 A * | 10/1987 | Hattori | B60N 2/66 297/284.9 |
| 4,720,141 A | 1/1988 | Sakamoto et al. | |
| 4,856,846 A * | 8/1989 | Lohmeyer | A47C 3/12 297/285 |
| 4,869,554 A * | 9/1989 | Abu-Isa | B60N 2/7011 297/448.2 |
| 4,892,356 A * | 1/1990 | Pittman | A47C 3/12 297/452.15 |
| 4,915,447 A | 4/1990 | Shovar | |
| 5,171,062 A | 12/1992 | Courtois | |
| 5,174,526 A | 12/1992 | Kanigowski | |
| 5,518,294 A | 5/1996 | Ligon, Sr. et al. | |
| 5,538,326 A * | 7/1996 | Lorbiecki | A47C 5/12 297/452.15 |
| 5,560,681 A | 10/1996 | Dixon et al. | |
| 5,647,635 A | 7/1997 | Aumond et al. | |
| 5,700,060 A * | 12/1997 | Bullard | A47C 7/24 297/452.5 |
| 5,755,493 A | 5/1998 | Kodaverdian | |
| 5,769,489 A | 6/1998 | Dellanno | |
| 5,826,938 A | 10/1998 | Yanase et al. | |
| 5,836,648 A | 11/1998 | Karschin et al. | |
| 5,902,014 A | 5/1999 | Dinkel et al. | |
| 5,913,568 A | 6/1999 | Brightbill et al. | |
| 5,951,039 A | 9/1999 | Severinski et al. | |
| 5,988,757 A * | 11/1999 | Vishey | B60N 2/23 297/452.18 |
| 6,024,406 A | 2/2000 | Charras et al. | |
| 6,036,273 A * | 3/2000 | Lin | A47C 5/06 297/452.63 |
| 6,062,642 A | 5/2000 | Sinnhuber et al. | |
| 6,082,825 A * | 7/2000 | Simon | A47C 7/35 267/101 |
| 6,116,694 A * | 9/2000 | Bullard | A47C 7/287 267/87 |
| 6,145,925 A | 11/2000 | Eksin et al. | |
| 6,155,593 A | 12/2000 | Kimura et al. | |
| 6,170,915 B1 * | 1/2001 | Weisz | A47C 7/35 267/87 |
| 6,179,379 B1 | 1/2001 | Andersson | |
| 6,189,966 B1 | 2/2001 | Faust et al. | |
| 6,196,627 B1 | 3/2001 | Faust et al. | |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,257,665 B1 * | 7/2001 | Nagamitsu | A47C 7/405 297/285 |
| 6,296,308 B1 | 10/2001 | Cosentino et al. | |
| 6,312,050 B1 | 11/2001 | Eklind | |
| 6,334,650 B1 * | 1/2002 | Chien-Chuan | A47C 7/024 297/228.1 |
| 6,364,414 B1 | 4/2002 | Specht | |
| 6,375,269 B1 | 4/2002 | Maeda et al. | |
| 6,394,546 B1 | 5/2002 | Knoblock et al. | |
| 6,446,945 B1 * | 9/2002 | Wisniewski | B60N 2/7094 267/105 |
| 6,454,353 B1 | 9/2002 | Knaus | |
| 6,499,807 B1 * | 12/2002 | Kaneda | A47C 7/46 297/452.49 |
| 6,523,892 B1 | 2/2003 | Matsumoto et al. | |
| 6,530,622 B1 | 3/2003 | Ekern et al. | |
| 6,550,856 B1 | 4/2003 | Ganser et al. | |
| 6,565,150 B2 | 5/2003 | Fischer et al. | |
| 6,565,153 B2 | 5/2003 | Hensel et al. | |
| 6,619,605 B2 | 9/2003 | Lambert | |
| 6,626,497 B2 * | 9/2003 | Nagamitsu | A47C 7/40 297/452.15 |
| 6,682,140 B2 | 1/2004 | Minuth et al. | |
| 6,695,406 B2 | 2/2004 | Plant | |
| 6,698,832 B2 | 3/2004 | Boudinot | |
| 6,736,452 B2 | 5/2004 | Aoki et al. | |
| 6,758,522 B2 | 7/2004 | Ligon, Sr. et al. | |
| 6,808,230 B2 | 10/2004 | Buss et al. | |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,997,473 B2 | 2/2006 | Tanase et al. | |
| 7,040,699 B2 | 5/2006 | Curran et al. | |

(56) References Cited

U.S. PATENT DOCUMENTS

| | | | |
|---|---|---|---|
| 7,090,301 B2* | 8/2006 | Stadlbauer | A47C 7/46 267/133 |
| 7,100,992 B2 | 9/2006 | Bargheer et al. | |
| 7,131,694 B1 | 11/2006 | Buffa | |
| 7,159,934 B2 | 1/2007 | Farquhar et al. | |
| 7,185,950 B2 | 3/2007 | Pettersson et al. | |
| 7,213,876 B2 | 5/2007 | Stoewe | |
| 7,229,118 B2 | 6/2007 | Saberan et al. | |
| 7,261,371 B2 | 8/2007 | Thunissen et al. | |
| 7,320,503 B2* | 1/2008 | Eysing | A47C 7/46 297/285 |
| 7,344,189 B2 | 3/2008 | Reed et al. | |
| 7,350,859 B2 | 4/2008 | Klukowski | |
| 7,393,005 B2 | 7/2008 | Inazu et al. | |
| 7,425,034 B2 | 9/2008 | Bajic et al. | |
| 7,441,838 B2 | 10/2008 | Patwardhan | |
| 7,467,823 B2 | 12/2008 | Hartwich | |
| 7,478,869 B2 | 1/2009 | Lazanja et al. | |
| 7,481,489 B2 | 1/2009 | Demick | |
| 7,481,493 B2* | 1/2009 | Fujita | A47C 7/28 297/284.2 |
| 7,506,924 B2 | 3/2009 | Bargheer et al. | |
| 7,506,938 B2 | 3/2009 | Brennan et al. | |
| 7,530,633 B2 | 5/2009 | Yokota et al. | |
| 7,543,888 B2 | 6/2009 | Kuno | |
| 7,578,552 B2 | 8/2009 | Bajic et al. | |
| 7,597,398 B2 | 10/2009 | Lindsay | |
| 7,614,693 B2 | 11/2009 | Ito | |
| 7,641,281 B2 | 1/2010 | Grimm | |
| 7,669,925 B2 | 3/2010 | Beck et al. | |
| 7,669,928 B2 | 3/2010 | Snyder | |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,752,720 B2 | 7/2010 | Smith | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,802,843 B2 | 9/2010 | Andersson et al. | |
| 7,819,470 B2 | 10/2010 | Humer et al. | |
| 7,823,971 B2 | 11/2010 | Humer et al. | |
| 7,845,729 B2 | 12/2010 | Yamada et al. | |
| 7,857,381 B2 | 12/2010 | Humer et al. | |
| 7,871,126 B2 | 1/2011 | Becker et al. | |
| 7,891,701 B2 | 2/2011 | Tracht et al. | |
| 7,909,360 B2 | 3/2011 | Marriott et al. | |
| 7,926,872 B2* | 4/2011 | Chida | B60N 2/4228 297/216.13 |
| 7,931,294 B2 | 4/2011 | Okada et al. | |
| 7,931,330 B2 | 4/2011 | Itou et al. | |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,971,931 B2 | 7/2011 | Lazanja et al. | |
| 7,971,937 B2 | 7/2011 | Ishii et al. | |
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,075,053 B2 | 12/2011 | Tracht et al. | |
| 8,109,569 B2 | 2/2012 | Mitchell | |
| 8,123,246 B2 | 2/2012 | Gilbert et al. | |
| 8,128,167 B2 | 3/2012 | Zhong et al. | |
| 8,162,391 B2 | 4/2012 | Lazanja et al. | |
| 8,162,397 B2 | 4/2012 | Booth et al. | |
| 8,167,370 B2 | 5/2012 | Arakawa et al. | |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 | 7/2012 | Mizoi | |
| 8,342,607 B2 | 1/2013 | Hofmann et al. | |
| 8,403,410 B1 | 3/2013 | Pinger et al. | |
| 8,590,978 B2* | 11/2013 | Jaranson | B60N 2/643 297/218.1 |
| 8,662,483 B2* | 3/2014 | Yamaguchi | B60N 2/002 267/102 |
| 8,690,255 B2* | 4/2014 | Yamaki | B60N 2/4228 297/216.14 |
| 8,727,374 B1* | 5/2014 | Line | B60R 21/207 280/728.3 |
| 8,814,269 B2* | 8/2014 | Suzuki | B60N 2/4228 297/216.13 |
| 8,876,215 B2* | 11/2014 | Sei | B60N 2/682 297/452.52 |
| 8,991,931 B2* | 3/2015 | Narita | A47C 7/30 297/452.1 |
| 9,096,157 B2* | 8/2015 | Line | B60N 2/5642 |
| 9,126,508 B2* | 9/2015 | Line | B60N 2/2222 |
| 9,216,677 B2* | 12/2015 | Line | B60N 2/6027 |
| 2002/0043870 A1* | 4/2002 | Kuster | B60N 2/449 297/452.52 |
| 2003/0209935 A1* | 11/2003 | Legal | A47C 5/06 297/452.63 |
| 2004/0100139 A1* | 5/2004 | Williams | A47C 7/405 297/452.31 |
| 2004/0195870 A1 | 10/2004 | Bohlender et al. | |
| 2005/0073183 A1* | 4/2005 | Hsiao | A47C 7/46 297/219.1 |
| 2005/0110327 A1* | 5/2005 | Chernoff | A47C 5/12 297/452.14 |
| 2005/0140190 A1* | 6/2005 | Kawashima | B60N 2/4228 297/216.14 |
| 2005/0200166 A1 | 9/2005 | Noh | |
| 2005/0236884 A1* | 10/2005 | Neale | B60N 2/5816 297/452.56 |
| 2006/0043777 A1 | 3/2006 | Friedman et al. | |
| 2007/0120401 A1 | 5/2007 | Minuth et al. | |
| 2008/0174159 A1 | 7/2008 | Kojima et al. | |
| 2009/0066122 A1 | 3/2009 | Minuth et al. | |
| 2009/0165263 A1 | 7/2009 | Smith | |
| 2009/0250991 A1* | 10/2009 | Mossbeck | A47C 4/54 297/452.41 |
| 2009/0302662 A1* | 12/2009 | Groelsma | A47C 7/40 297/452.18 |
| 2009/0322124 A1 | 12/2009 | Barkow et al. | |
| 2010/0038937 A1 | 2/2010 | Andersson et al. | |
| 2010/0127551 A1* | 5/2010 | Heidmann | A47C 4/02 297/452.48 |
| 2010/0140986 A1 | 6/2010 | Sawada | |
| 2010/0171346 A1 | 7/2010 | Laframboise et al. | |
| 2010/0187881 A1 | 7/2010 | Fujita et al. | |
| 2010/0201167 A1 | 8/2010 | Wieclawski | |
| 2010/0207431 A1* | 8/2010 | Petzel | B60N 2/4415 297/180.16 |
| 2010/0231013 A1 | 9/2010 | Schlenker | |
| 2010/0270840 A1 | 10/2010 | Tanaka et al. | |
| 2010/0301650 A1 | 12/2010 | Hong | |
| 2010/0320816 A1 | 12/2010 | Michalak | |
| 2011/0018498 A1 | 1/2011 | Soar | |
| 2011/0074185 A1 | 3/2011 | Nakaya et al. | |
| 2011/0095513 A1 | 4/2011 | Tracht et al. | |
| 2011/0095578 A1 | 4/2011 | Festag | |
| 2011/0109127 A1 | 5/2011 | Park et al. | |
| 2011/0109128 A1 | 5/2011 | Axakov et al. | |
| 2011/0121624 A1 | 5/2011 | Brncick et al. | |
| 2011/0133525 A1 | 6/2011 | Oota | |
| 2011/0163574 A1 | 7/2011 | Tame et al. | |
| 2011/0163583 A1 | 7/2011 | Zhong et al. | |
| 2011/0186560 A1 | 8/2011 | Kennedy et al. | |
| 2011/0187174 A1 | 8/2011 | Tscherbner | |
| 2011/0254335 A1 | 10/2011 | Pradier et al. | |
| 2011/0260506 A1 | 10/2011 | Kuno | |
| 2011/0272548 A1 | 11/2011 | Rudkowski et al. | |
| 2011/0272978 A1 | 11/2011 | Nitsuma | |
| 2011/0278885 A1 | 11/2011 | Procter et al. | |
| 2011/0278886 A1 | 11/2011 | Nitsuma | |
| 2011/0298261 A1 | 12/2011 | Holt et al. | |
| 2012/0032486 A1 | 2/2012 | Baker et al. | |
| 2012/0037754 A1 | 2/2012 | Kladde | |
| 2012/0063081 A1 | 3/2012 | Grunwald | |

(56) References Cited

U.S. PATENT DOCUMENTS

| | | | |
|---|---|---|---|
| 2012/0080914 A1 | 4/2012 | Wang | |
| 2012/0091695 A1 | 4/2012 | Richez et al. | |
| 2012/0091766 A1 | 4/2012 | Yamaki et al. | |
| 2012/0091779 A1 | 4/2012 | Chang et al. | |
| 2012/0109468 A1 | 5/2012 | Baumann et al. | |
| 2012/0119551 A1 | 5/2012 | Brncick et al. | |
| 2012/0125959 A1 | 5/2012 | Kucera | |
| 2012/0127643 A1 | 5/2012 | Mitchell | |
| 2012/0129440 A1 | 5/2012 | Kitaguchi et al. | |
| 2012/0162891 A1 | 6/2012 | Tranchina et al. | |
| 2012/0175924 A1 | 7/2012 | Festag et al. | |
| 2012/0187729 A1 | 7/2012 | Fukawatase et al. | |
| 2012/0248833 A1 | 10/2012 | Hontz et al. | |
| 2012/0261974 A1 | 10/2012 | Yoshizawa et al. | |
| 2013/0076092 A1 | 3/2013 | Kulkarni et al. | |
| 2013/0119715 A1 | 5/2013 | Medoro et al. | |
| 2015/0084395 A1* | 3/2015 | Da Silva Lopes | A47C 7/28 297/452.63 |

FOREIGN PATENT DOCUMENTS

| | | |
|---|---|---|
| EP | 0921033 A2 | 6/1999 |
| EP | 0926969 | 1/2002 |
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| EP | 2534979 A1 | 12/2012 |
| EP | 2574498 A1 | 4/2013 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |
| WO | 2013/040085 A2 | 3/2013 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.COM, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

* cited by examiner

TUNED FLEXIBLE SUPPORT MEMBER AND FLEXIBLE SUSPENSION FEATURES FOR COMFORT CARRIERS

FIELD OF THE DISCLOSURE

The present disclosure generally relates to a support member and suspension features for a vehicle, and more particularly to a tuned flexible support member and flexible suspension features for comfort carriers disposed within a vehicle seatback.

BACKGROUND OF THE DISCLOSURE

Vehicle seating assemblies typically include a seatback to support a back of an occupant in an upright sitting position and various reclined positions. Similar to other portions of a vehicle seating assembly, seatbacks are commonly designed to support an occupant in the upright sitting position upon acceleration, change in direction, and collision of the vehicle. Accordingly, seatbacks are substantially rigid and sizeable in construction.

SUMMARY OF THE DISCLOSURE

According to one aspect of the present disclosure, a vehicle seat support carrier includes an upper seatback panel having a flexible body portion. A first set of flexible suspension members undulate in a first direction. A second set of flexible suspension members undulate in a second direction generally perpendicular to the first direction. A lower seatback panel is operably coupled to the upper seatback panel. The lower seatback panel includes a border member defining a central aperture and first and second bolster supports. A central portion of each of the first and second bolster supports includes a plurality of flexible suspension members.

According to another aspect of the present disclosure, a vehicle seat support carrier includes an upper seatback panel having a first set of flexible suspension members undulating in a first direction and a second set of flexible suspension members undulating in a second direction. A lower seatback panel is proximate the upper seatback panel and includes first and second bolster supports. A central portion of each of the first and second bolster supports includes a plurality of flexible suspension members.

According to yet another aspect of the present disclosure, a vehicle seat support carrier includes an upper seatback panel having a first set of polymeric suspension members undulating in a first direction and a second set of polymeric suspension members undulating in a second direction. A lower seatback panel is proximate the upper seatback panel and includes first and second bolster supports. The first and second bolster supports include a plurality of undulating polymeric suspension members.

According to still another aspect of the present disclosure, a vehicle seating assembly includes a vehicle seat support carrier having an upper seatback panel and a lower seatback panel. The upper seatback panel includes flexible suspension members arranged in an undulating manner that flex under the weight of a seated passenger, thereby providing additional suspension and comfort to a passenger.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
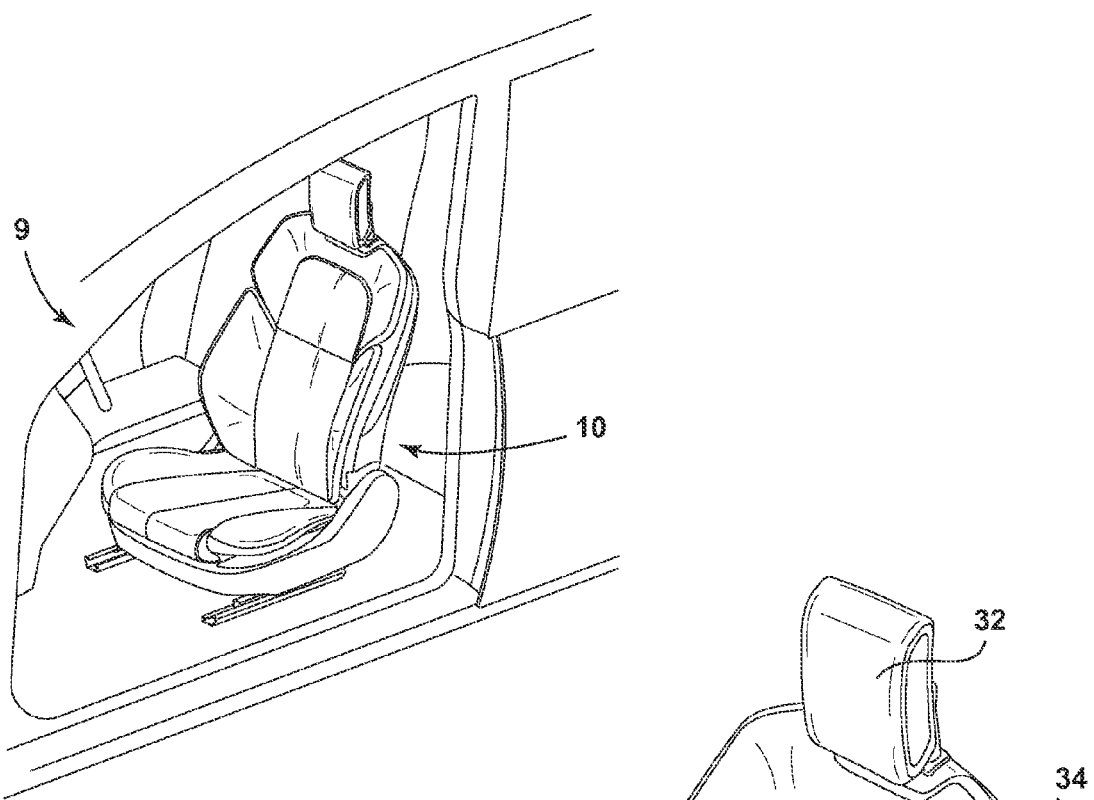
FIG. 1 is a top perspective view of one embodiment of a vehicle seating assembly of the present disclosure positioned inside a vehicle.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 2:
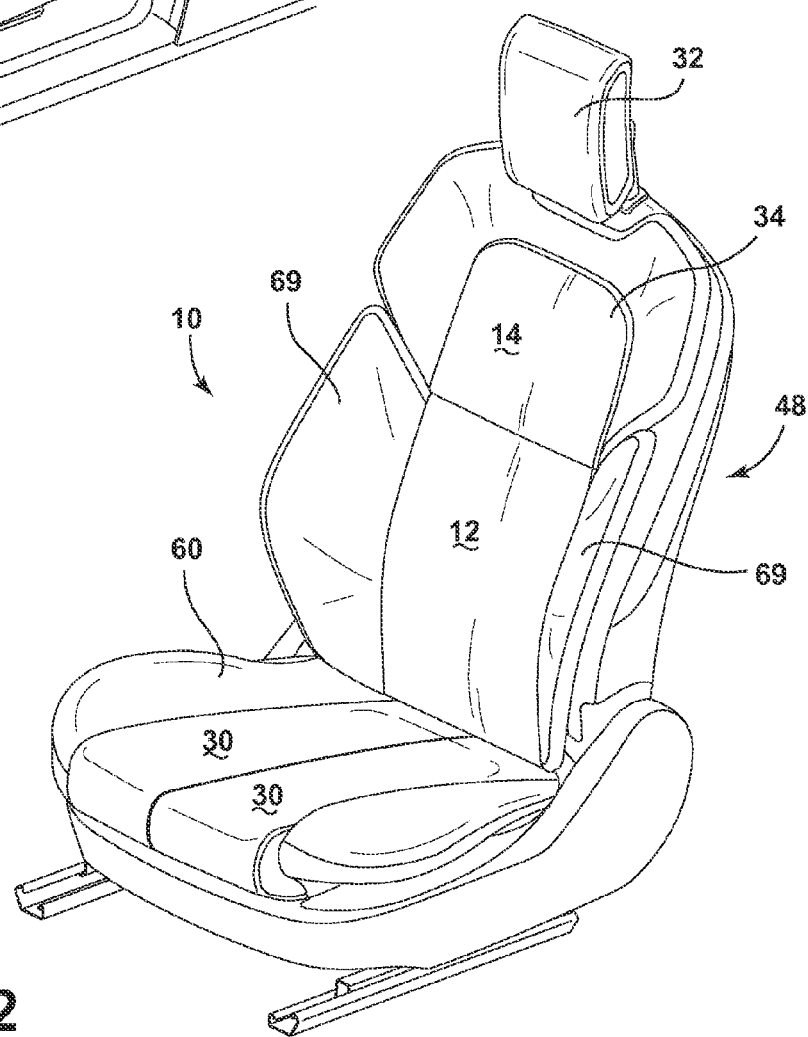
FIG. 2 is a top perspective view of the vehicle seating assembly of FIG. 1.

With reference to FIGS. 1 and 2, the vehicle seating assembly set forth herein is generally configured for use in any type of vehicle including cars, vans, and trucks. The vehicle seating assembly is supported on rail slide assemblies that include a rail fixedly attached to a floor of the vehicle and a slide fixedly attached to an underside or bottom of a seat of the vehicle seating assembly. The rail is slidably coupled with the slide, such that the vehicle seating assembly can be moved between fore and aft positions inside the vehicle.

The vehicle seating assembly generally includes a seatback having an upper seatback and a lower seatback, as well as a head restraint disposed above the upper seatback. The seatback is pivotally coupled with the seat at a rear portion thereof. The seat is slidably disposed on the rail slide assemblies and includes first and second thigh bolsters, as well as first and second thigh supports. It is generally contemplated that the first and second thigh supports may be independent of one another to provide independent support to each of the legs of a passenger. The seat is supported on a seat frame.

Referring to FIGS. 1-7, reference numeral 9 generally designates a vehicle having a vehicle seating assembly 10 that includes a lower seatback 12. An upper seatback 14 is operably coupled to the lower seatback 12. The upper seatback 14 is pivotally mounted to the lower seatback 12 at a pivot axis 16. An arcuate back support bar 18 is disposed in the upper seatback 14 and is configured to rotate the upper seatback 14 between forward and rearward positions. The arcuate back support bar 18 includes first and second generally linear members 20, 22 and an arcuate intermediate portion 24 disposed between the first and second generally linear members 20, 22. A reclining assembly operably couples the lower seatback 12 with the upper seatback 14.

With reference again to FIG. 1, the illustrated vehicle seating assembly 10 is configured for use in a vehicle of any type, including, without limitation, cars, vans, trucks, buses, etc. The vehicle seating assembly 10 is suspended on rails that allow movement of the vehicle seating assembly 10 in fore and aft directions. In addition, the vehicle seating assembly 10 may include a variety of comfort controls, including, for example, thigh support using independent thigh bolsters 30, lumbar support, and upper thoracic support. The vehicle seating assembly 10 includes a head restraint 32 that is disposed on the upper seatback 14. The head restraint 32 is movable between forward and rearward positions to accommodate various sized heads of passengers, as well as different heights of passengers. The vehicle seating assembly 10 also includes controls specifically configured to adjust an upper thoracic portion 34 of the upper seatback 14.

Figure 3:
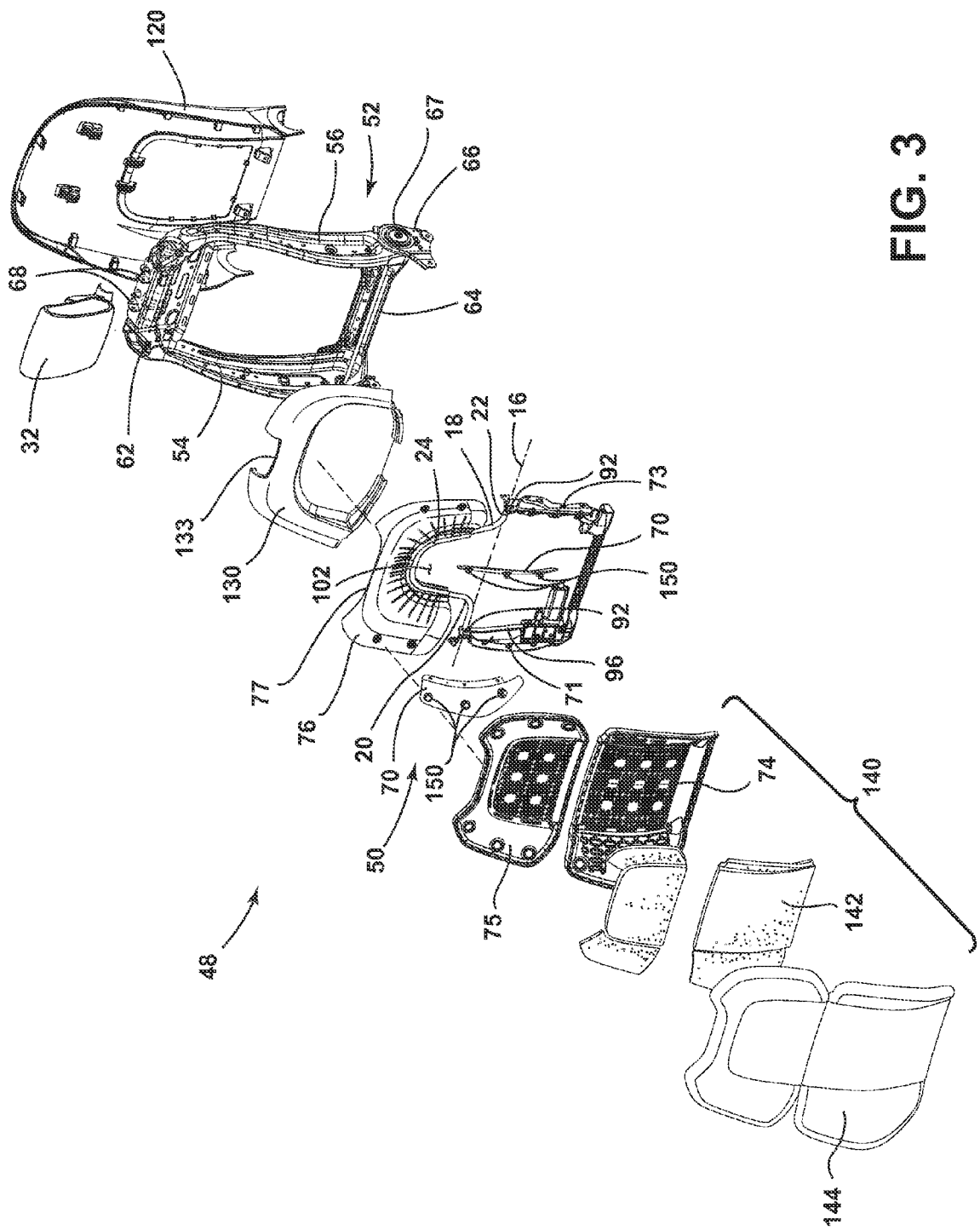
FIG. 3 is a top perspective exploded view of a vehicle seatback of the present disclosure.

With reference to FIG. 3, the vehicle seating assembly 10 includes a seatback assembly 48 with a seatback suspension system 50 supported on a frame 52. The frame 52 of the seatback assembly 48 of the vehicle seating assembly 10 includes a first side support 54 and a second side support 56 that define the frame 52. The first and second side supports 54, 56 of the frame 52 pivotally couple with a rear portion of a seat 60 and extend upward from the seat 60 to a top portion of the seatback assembly 48 and connect with an upper lateral brace 62. The upper lateral brace 62 of the seatback assembly 48 extends between the first and second side supports 54, 56. The head restraint 32 is operably coupled with the upper lateral brace 62 of the seatback assembly 48 and is substantially centered between the first and second side supports 54, 56. The upper lateral brace 62, as well as a lower lateral brace 64, of the seatback suspension system 50 are coupled with and span between the first and second side supports 54, 56, such that the seatback suspension system 50 is positioned generally between the head restraint 32 and the seat 60 to support the back of a passenger. It is contemplated that the head restraint 32 may be integrated with the top portion of the seatback assembly 48 or that the head restraint 32 may otherwise not be included on the vehicle seating assembly 10.

Referring again to FIG. 3, the first and second side supports 54, 56 extend upward from a recliner heart bracket 66 having a recliner heart 67 that pivotally couples the seatback assembly 48 with the seat 60. The first and second side supports 54, 56 are substantially parallel with each other and curve upward and rearward from the recliner heart bracket 66 to provide a curved shape that complements the shape of the spinal column of a passenger. Further, the first and second side supports 54, 56 are thicker and more robust proximate the recliner heart bracket 66 and taper as they extend upward to couple with the upper lateral brace 62 that extends orthogonally between the first and second side supports 54, 56. The upper lateral brace 62 of the frame 52 includes connectors 68 for securing the head restraint 32 at a central portion of the upper lateral brace 62 centrally between the first and second side supports 54, 56. The connectors 68 are defined by upward protruding tabs configured to couple with the head restraint 32.

With reference again to FIGS. 3-7, the lower seatback 12 of the seatback suspension system 50, as shown in FIG. 3, includes flex members 70 extending from each of a first side connector 71 and a second side connector 73 of the seatback assembly 48. The first and second side connectors 71, 73 are operably coupled with and support side bolsters 69 (FIG. 2). The lower seatback 12 is positioned adjacent to the seat 60 and includes a lower comfort carrier 74 that supports the lower back of a passenger. Similarly, the upper seatback 14 of the seatback assembly 48 has an upper comfort carrier 75 operably coupled with a curved flex member 76 operably coupled with the arcuate back support bar 18. The flex member 76 of the upper lateral brace 62 is disposed above the first and second side connectors 71, 73. The flex member 76 includes a recess 77 in a top portion thereof configured to adequately space the flex member 76 from the head restraint 32. The flex member 76 also includes a plurality of outwardly extending reinforcement flanges 81. The curved flex member 76 includes three connecting features 83 that work as snap-fit connecting arrangements to secure the upper comfort carrier 75 with the curved flex member 76. In the illustrated embodiment, the arcuate back support bar 18 is coupled with the flex member 76 via a friction-fit engagement. Other connecting arrangements are also contemplated. It is conceivable that the lower and upper seatbacks 12, 14 may be integrated into a single component or several components spanning the seatback assembly 48.

The flex member 76 of the upper seatback 14 of the seatback suspension system 50, as shown in FIGS. 4-7, generally defines a support basket that supports the upper back of a passenger. The flex member 76 of the upper lateral brace 62 is coupled with the arcuate back support bar 18 that laterally extends between the first and second side supports 54, 56 of the frame 52. The arcuate back support bar 18 is pivotally coupled relative to pivot pins 92 to allow the flex member 76 to pivot forward and rearward about the pivot axis 16. Further, the arcuate back support bar 18 is operably coupled with a motor 94 via a linking member 96 to adjustably rotate the arcuate back support bar 18. Consequently, the upper seatback 14 can be pivoted forward and rearward relative to a plurality of angled positions to the lower seatback 12 and the frame 52, as described in more detail below.

With reference again to FIGS. 3-6, the pivot pins 92 generally define the pivot axis 16. The upper seatback 14 includes a forward articulating portion 100 that is operably coupled to the lower seatback 12. More specifically, the forward articulating portion 100 is pivotally mounted to the lower seatback 12 at the pivot axis 16. The arcuate back support bar 18 is disposed in the upper seatback 14 and configured to rotate the upper seatback 14 between forward and rearward positions. The arcuate back support bar 18 includes a generally U-shaped configuration. The first and second generally linear members 20, 22 and the arcuate intermediate portion 24 generally define a central open space 102 in the seatback assembly 48. An articulation assembly 110 operably couples the forward articulating portion 100 of the upper seatback 14 with the seatback assembly 48 and allows for movement between the forward and rearward positions. Notably, the flex member 76 or support basket may be fastened to the arcuate intermediate portion 24 of the arcuate back support bar 18, or may be overmolded directly onto the arcuate intermediate portion 24. The arcuate back support bar 18 is connected to brackets 112 that extend forward relative to the first and second generally linear members 20, 22 of the arcuate back support bar 18. The arcuate back support bar 18 is configured to rotate about a forward portion of the brackets 112 at the pivot pins 92. Consequently, the entire upper seatback 14 can be rotated about a forward portion of the brackets 112.

The seatback suspension system 50, as shown in FIG. 3, includes the frame 52, which may be constructed of metal or other rigid material, and a hard back panel 120 configured to substantially enclose a rear portion of the frame 52. The vehicle seating assembly 10 also includes a front trim panel 130. The front trim panel 130, together with the hard back panel 120, generally define a shell that covers the frame 52 of the seatback assembly 48. The hard back panel 120 couples with the frame 52 to substantially enclose a rear portion of the frame 52. Similarly, the front trim panel 130 couples with a front portion of the frame 52 to enclose a top front portion of the frame 52. The front trim panel 130 includes a mounting cutaway 133 for accommodating the head restraint 32, which extends therethrough to couple with the upper lateral brace 62 of the frame 52. The front trim panel 130 and the hard back panel 120 also engage the frame 52 proximate the upper lateral brace 62, the first side support 54, and the second side support 56, substantially enclosing an edge portion of the frame 52. The front trim panel 130 and hard back panel 120 are typically molded with a polymer material and the frame 52 is constructed substantially of steel, aluminum, or another substantially rigid metal. It is conceivable that alternative materials or forming methods may be used for the shell and the frame 52. In addition, the shell, or portions thereof, may conceivably be integrated with the frame 52.

Referring once again to FIG. 3, the upper seatback 14 and lower seatback 12 of the seatback suspension system 50 are configured to operably couple with a passenger cushion assembly 140. More specifically, the flex members 70, 76 on the lower seatback 12 and upper seatback 14, respectively, extend forward to engage and support the back of a passenger. The passenger cushion assembly 140 includes the lower comfort carrier 74, the upper comfort carrier 75, a cushion assembly 142, and a coverstock 144. The flex members 70, 76 operably couple to the lower comfort carrier 74 and the upper comfort carrier 75 in a snap-fit and friction-fit arrangement. The cushion assembly 142 is disposed between the lower comfort carrier 74 and the upper comfort carrier 75 and the coverstock 144 and between the lower comfort carrier 74 and the coverstock 144. It is conceivable that the passenger cushion assembly 140 may include more or fewer layers between the coverstock 144 and the upper comfort carrier 75. Further, it is conceivable that the passenger cushion assembly 140 may be one integral piece with the flex members 70, 76 of the seatback suspension system 50.

As shown in FIG. 3, the flex members 70 each include three connecting features 150 arranged longitudinally and in alignment with complementary features on first and second side connectors 71, 73 of the lower seatback 12 for fastening the flex members 70 of the lower seatback 12 to the passenger cushion assembly 140. The flex members 70 of the lower seatback 12 extend forward and outward from the seatback assembly 48 to create an external peripheral gap 152. The pivot pins 92 pivotally couple with the first and second side connectors 71, 73, generally above the lower lateral brace 64.

Figure 4:
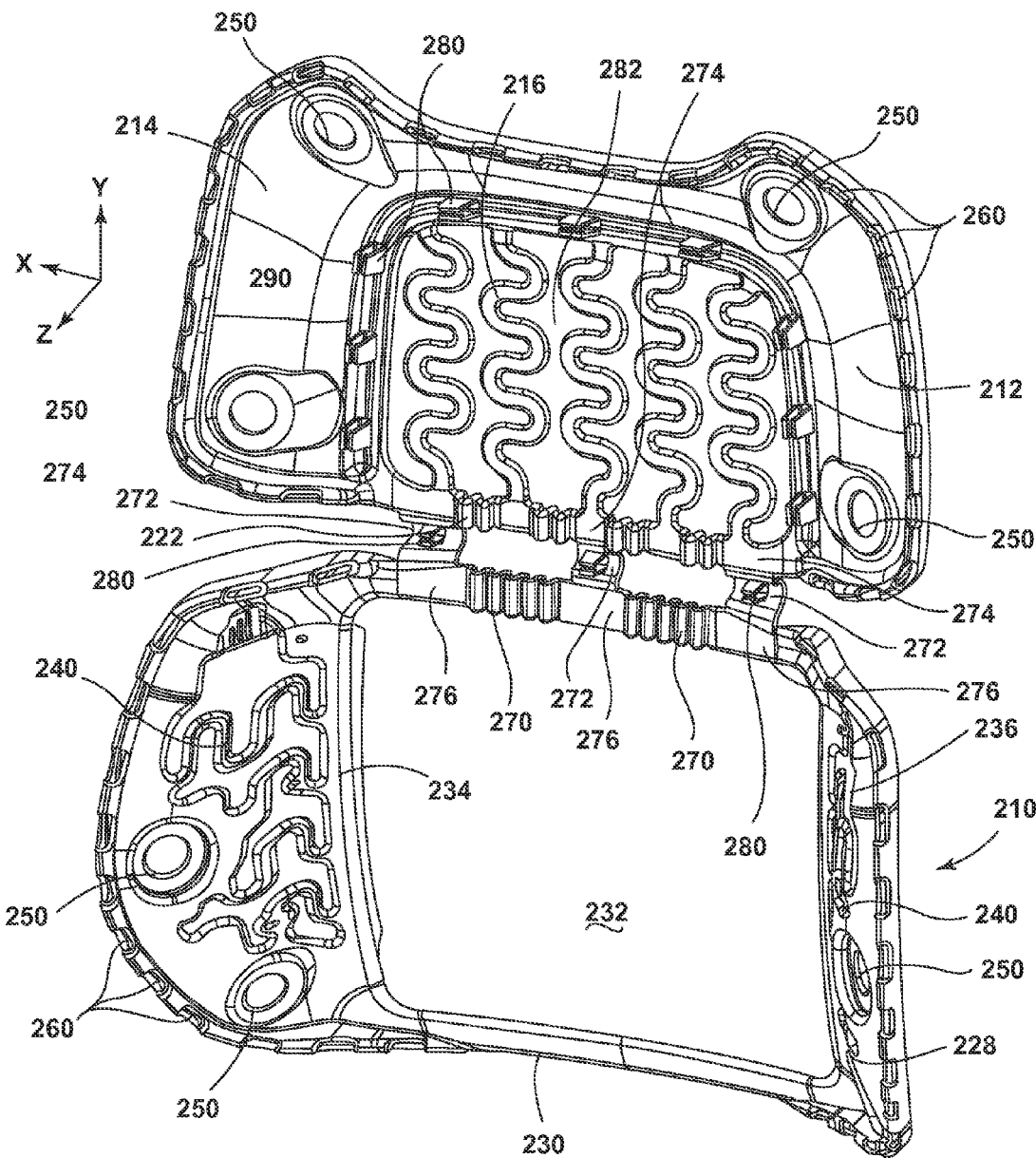
FIG. 4 is a top perspective view of a vehicle seat support carrier.

Referring to FIG. 4, reference numeral 210 generally designates another embodiment of a vehicle seat support carrier including an upper seatback panel 212 with a flexible body portion 214. A first set of flexible suspension members 216 undulate in a first direction Y. A second set of flexible suspension members 222 undulate in a second direction X generally perpendicular to the first direction Y. A lower seatback panel 228 is operably coupled to the upper seatback panel 212. The lower seatback panel 228 includes a border member 230 defining a central aperture 232 and first and second bolster supports 234, 236. A central portion 238 of each of the first and second bolster supports 234, 236 includes a plurality of flexible suspension members 240.

With reference again to FIG. 4, the illustrated vehicle seat support carrier 210 includes a plurality of quick connect features 250 disposed on both the upper seatback panel 212 and the lower seatback panel 228. In the illustrated embodiment, the quick connect features 250 are apertures designed to engage or receive a snap-fit connector disposed on a rear side of the cushion assembly 142. Accordingly, the cushion assembly 142 can be readily connected with or disconnected from the vehicle seat support carrier 210 without the need for fasteners or tools. In addition, both the upper seatback panel 212 and the lower seatback panel 228 include a plurality of peripheral trim engagement features 260. In the illustrated embodiment, the peripheral trim engagement features 260 are in the form of evenly spaced slots defined in sides of the upper seatback panel 212 and the lower seatback panel 228 designed to receive connecting inserts disposed on a periphery of the coverstock 144. Accordingly, the coverstock 144 can be readily connected with the cushion assembly 142 and the vehicle seat support carrier 210 by connecting the periphery of the coverstock 144 with the peripheral trim engagement features 260. It will be generally understood that the quick connect features 250 for the upper seatback panel 212 and the lower seatback panel 228, as well as the peripheral trim engagement features 260, may take on a variety of constructions, and that these features are not limited to the illustrated embodiment. It will also be understood that more or less of the quick connect features 250 and peripheral trim engagement features 260 may be provided based on the desired use.

With reference again to FIG. 4, the second set of flexible suspension members 222 that undulate in the second direction X are located on a lower portion of the upper seatback panel 212. A third set of flexible suspension members 270 that also undulate in the second direction X are disposed on a top portion of the lower seatback panel 228. The third set of flexible suspension members 270 generally undulate in a similar fashion to the second set of flexible suspension members 222. Although the third set of flexible suspension members 270 are generally contemplated to undulate in the same direction as the second set of flexible suspension members 222, it is also contemplated that the second set of flexible suspension members 222 and the third set of flexible suspension members 270 may be undulating in separate offset directions. The upper seatback panel 212 and the lower seatback panel 228 are separated by a plurality of bendable connecting arches 272. Each of the bendable connecting arches 272 transitions between a planar portion 274 on the upper seatback panel 212 and a planar portion 276 on the lower seatback panel 228. Additionally, each of the bendable connecting arches 272 includes a plurality of retaining clips 280 configured to secure with a complementary connector on the cushion assembly 142. The plurality of retaining clips 280 are also disposed around an intermediate open area 282 of the upper seatback panel 212. The plurality of retaining clips 280 can also be arranged in other portions of the upper seatback panel 212 or on portions of the lower seatback panel 228. The first set of flexible suspension members 216 that undulate in the first direction Y are disposed in the intermediate open area 282 of the upper seatback panel 212. In the illustrated embodiment, five suspension members 216 are illustrated in the intermediate open area 282 of the upper seatback panel 212. However, it is generally contemplated that more or less flexible suspension members may be disposed in the upper seatback panel 212.

Figure 5:
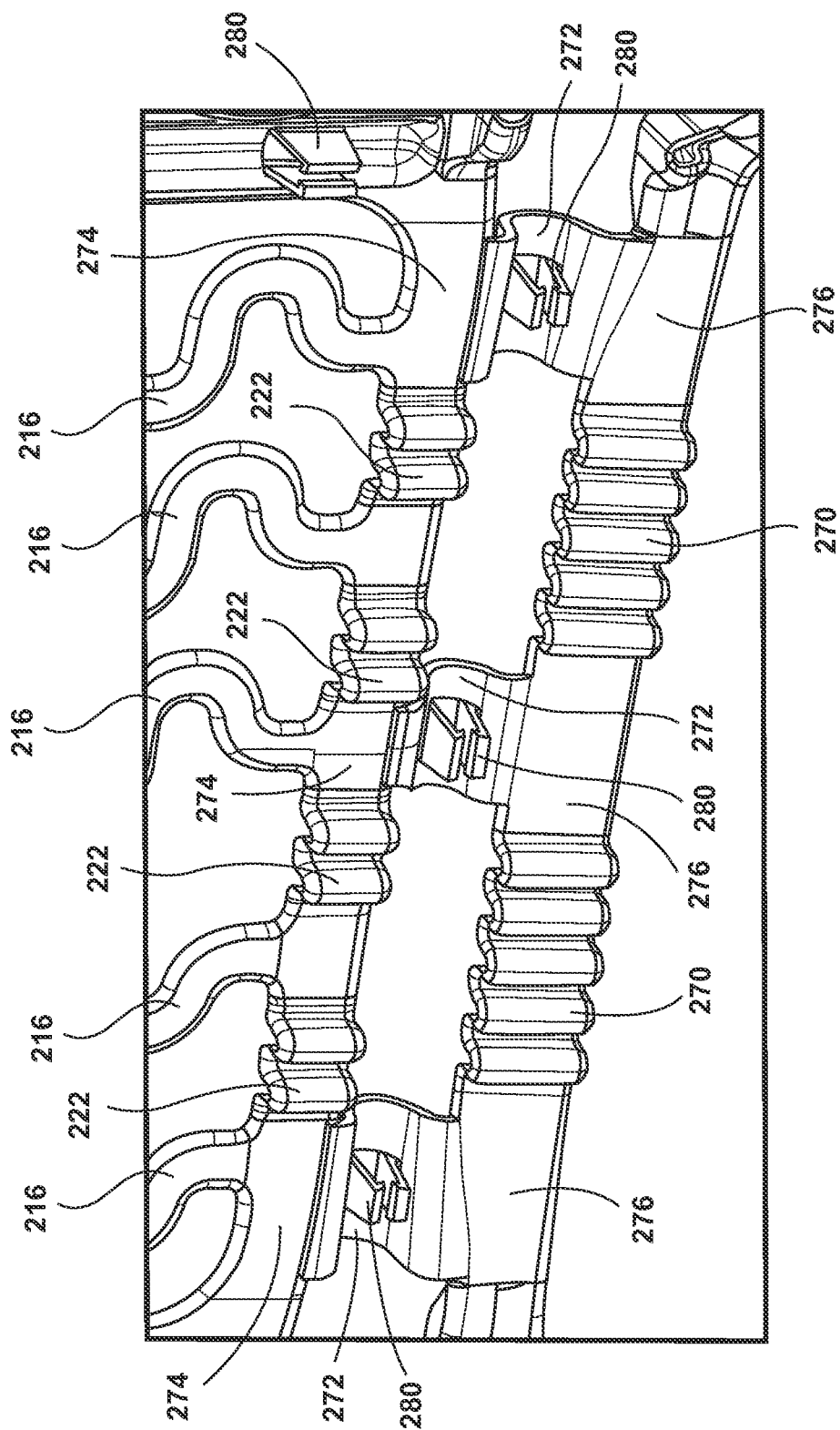
FIG. 5 is an enlarged top perspective partial view of the transition between an upper seatback panel and a lower seatback panel.
Figure 6:
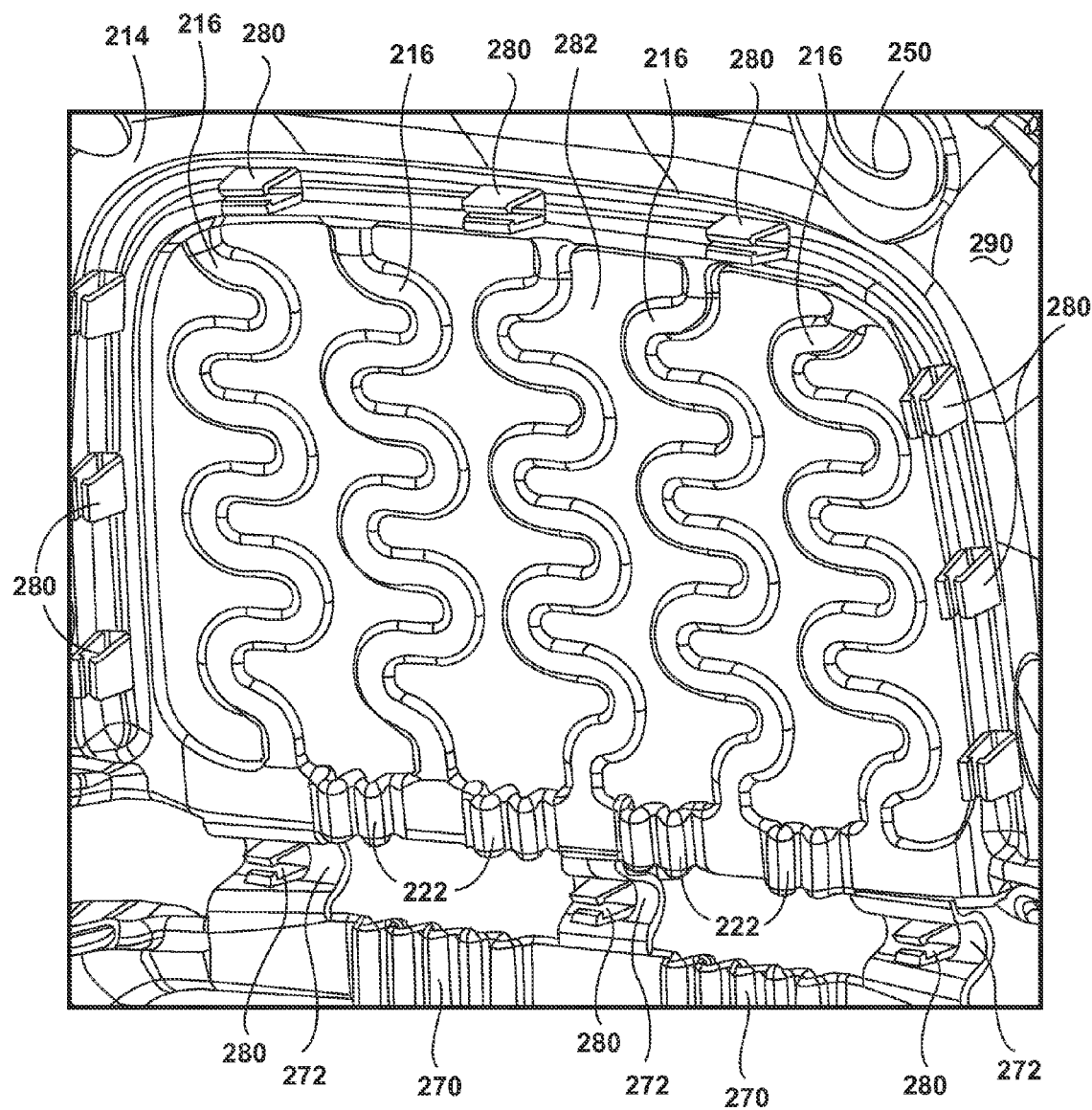
FIG. 6 is a top perspective view of an upper seatback panel of the present disclosure.
Figure 7:
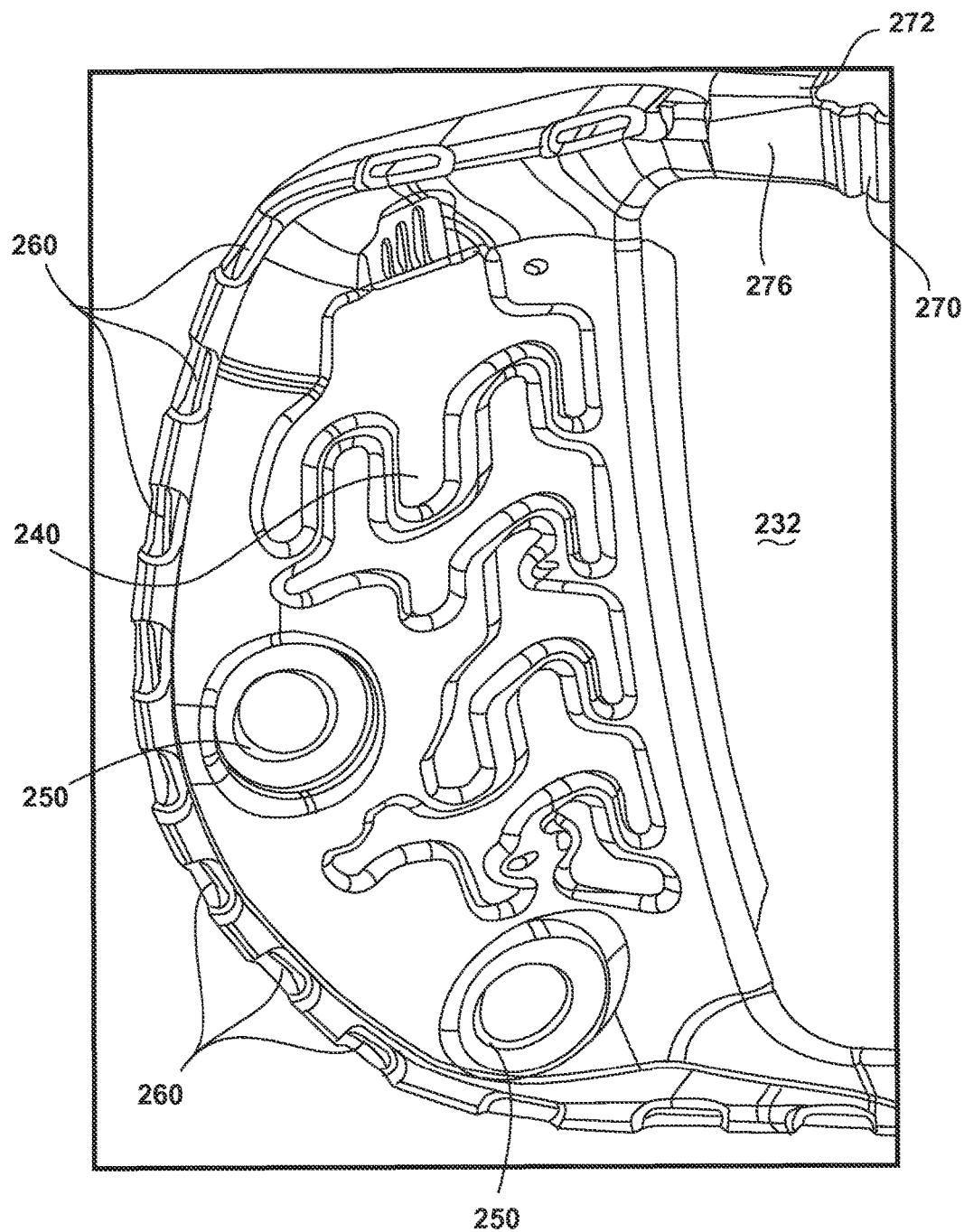
FIG. 7 is an enlarged front perspective view of a bolster support from a lower seatback panel of the present disclosure.

With reference to FIGS. 4 and 5, the second set of flexible suspension members 222 is disposed generally below and between each of the flexible suspension members that undulate in the intermediate open area 282 of the upper seatback panel 212. The flexible suspension members are disposed between each of the flexible suspension members and allow for flex across the upper seatback panel 212. The third set of flexible suspension members 270 are disposed below the second set of flexible suspension members 222 and define an upper portion of the lower seatback panel 228. Similar to the second set of flexible suspension members 222, the third set of flexible suspension members 270 allow for flexure across the lower seatback panel 228. The border member 230 of the lower seatback panel 228 generally defines the central aperture 232. The central aperture 232 is defined to provide spacing for a climate control system disposed in the lower seatback panel 228. The lower seatback panel 228 also includes the first and second bolster supports 234, 236 disposed on each side of the lower seatback panel 228 of the flexible suspension members. Each of the flexible suspension members of the first and second bolster supports 234, 236 for the lower seatback panel 228 is configured to allow flexure of the first and second bolster supports 234, 236 and increased comfort to a passenger. The upper seatback panel 212 includes generally solid bolster supports 290 configured to provide some flexure, but generally more rigidity than the first and second bolster supports 234, 236 of the lower seatback panel 228. All of the suspension members disclosed herein are generally constructed from a flexible material that is integral with the remainder of the upper seatback panel 212 and lower seatback panel 228. Accordingly, because of the polymeric construction, the suspension members are configured to uniformly flex under the weight of a passenger.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seat support carrier comprising:
   an upper seatback panel including a flexible body portion and a lower cross-member comprising:
      a first set of flexible suspension members extending from the lower cross-member and undulating in a first direction; and
      a second set of flexible suspension members disposed in the lower cross-member and undulating in a second direction generally perpendicular to the first direction; and
   a lower seatback panel operably coupled to the upper seatback panel, the lower seatback panel comprising:
      a border member defining a central aperture; and
      first and second bolster supports, wherein a central portion of each of the first and second bolster supports includes an undulating flexible suspension member.

2. The vehicle seat support carrier of claim 1, further comprising:
   a plurality of quick connect features disposed on both the upper seatback panel and the lower seatback panel.

3. The vehicle seat support carrier of claim 1, further comprising:
a third set of flexible suspension members proximate the second set of flexible suspension members.

4. The vehicle seat support carrier of claim 3, wherein the third set of flexible suspension members undulate in the second direction.

5. The vehicle seat support carrier of claim 1, wherein the upper seatback panel and the lower seatback panel are separated by a plurality of bendable connecting arches.

6. The vehicle seat support carrier of claim 5, further comprising:
a retaining clip disposed in each of the bendable connecting arches.

7. The vehicle seat support carrier of claim 1, further comprising:
a plurality of retaining clips extending around the first set of flexible suspension members.

8. A vehicle seat support carrier comprising:
an upper seatback panel including a first set of flexible suspension members undulating in a first direction from a cross-member and a second set of flexible suspension members undulating in a second direction in the cross-member; and
a lower seatback panel proximate the upper seatback panel and having first and second bolster supports, wherein the first and second bolster supports include undulating flexible suspension members.

9. The vehicle seat support carrier of claim 8, wherein the lower seatback panel includes a border member defining a central aperture.

10. The vehicle seat support carrier of claim 8, further comprising:
a plurality of quick connect features disposed on both the upper seatback panel and the lower seatback panel.

11. The vehicle seat support carrier of claim 8, further comprising:
a third set of flexible suspension members proximate the second set of flexible suspension members.

12. The vehicle seat support carrier of claim 11, wherein the third set of flexible suspension members undulate in the same direction as the second set of flexible members.

13. The vehicle seat support carrier of claim 8, wherein the upper seatback panel and the lower seatback panel are separated by a plurality of bendable connecting arches.

14. The vehicle seat support carrier of claim 13, further comprising:
a retaining clip disposed in each of the bendable connecting arches.

15. The vehicle seat support carrier of claim 8, further comprising:
a plurality of retaining clips extending around the first set of flexible suspension members.

16. The vehicle seat support carrier of claim 8, further comprising:
solid bolster supports disposed on the upper seatback panel.

17. A vehicle seat support carrier comprising:
an upper seatback panel including a first set of suspension members defining first undulations extending in a first direction and a second set of suspension members defining second undulations extending in a second direction normal to the first direction; and
a lower seatback panel proximate the upper seatback panel and having first and second bolster supports, each including a plurality of undulating polymeric suspension members.

18. The vehicle seat support carrier of claim 17, wherein the upper seatback panel and the lower seatback panel are separated by a plurality of bendable connecting arches.

19. The vehicle seat support carrier of claim 17, wherein the lower seatback panel includes a border member defining a central aperture.

20. The vehicle seat support carrier of claim 17, further comprising:
a plurality of quick connect features disposed on both the upper seatback panel and the lower seatback panel.

* * * * *